United States Patent [19]

Clasen

[11] Patent Number: 4,684,385
[45] Date of Patent: Aug. 4, 1987

[54] METHOD FOR THE MANUFACTURE OF GLASS BODIES

[75] Inventor: Rolf Clasen, Aachen, Fed. Rep. of Germany

[73] Assignee: U.S. Philips Corporation, New York, N.Y.

[21] Appl. No.: 835,589

[22] Filed: Mar. 3, 1986

[30] Foreign Application Priority Data

Mar. 29, 1985 [DE] Fed. Rep. of Germany ....... 3511453

[51] Int. Cl.$^4$ ........................................... C03B 37/023
[52] U.S. Cl. .............................................. 65/17; 65/2; 65/3.11; 65/3.12; 65/18.1; 65/18.3; 65/900; 65/901; 156/DIG. 108; 264/23; 264/60; 501/12
[58] Field of Search ...................... 65/2, 3.11, 3.12, 17, 65/18.1, 18.3, 18.4, DIG. 16, DIG. 900, DIG. 901; 501/12; 264/60, 23; 156/DIG. 108

[56] References Cited

U.S. PATENT DOCUMENTS

| | | | |
|---|---|---|---|
| 4,417,910 | 11/1983 | Passaret | 65/3.12 |
| 4,574,063 | 3/1986 | Scherer | 65/18.1 X |
| 4,605,428 | 8/1986 | Johnson et al. | 65/17 X |

FOREIGN PATENT DOCUMENTS

| | | | |
|---|---|---|---|
| 59-152235 | 8/1984 | Japan | 65/2 |
| 60-54928 | 3/1985 | Japan | 65/17 |

Primary Examiner—Robert L. Lindsay
Attorney, Agent, or Firm—Norman N. Spain

[57] ABSTRACT

Method and equipment for the manufacture of glass bodies in which a porous green body is formed from the starting material for the glass body in the form of a thixotropic suspension, is dried, purified and then sintered, during which process the starting material is transformed into a state with minimum viscosity and homogenized by the introduction of mechanical forces, is poured in the low-viscosity state into a mould of hydrophobic material corresponding to the shape of the glass body to be manufactured and is dried in the mould until a shrinkage of approximately 10% is achieved and then, after removal from the mould, is subjected to further processing steps to produce the glass body.

15 Claims, 2 Drawing Figures

METHOD FOR THE MANUFACTURE OF GLASS BODIES

BACKGROUND OF THE INVENTION

The invention relates to a method for the manufacture of glass bodies in which a porous green body is formed from the starting material for the glass in the form of a thixotropic suspension, is dried, purified and then sintered.

The invention also relates to equipment for carrying out such a method and to the application of the glass bodies produced in accordance with the invention method.

The method referred to in the preamble is particularly suitable for the production of preforms for optical waveguides of fused silica (quartz glass).

Optical waveguides are used in a large number of applications, both for short-distance and long-distance light-transmission systems, such as in optical communication systems, and consist mainly of a glass with a high silicon dioxide content (which, where required, contains a doping agent for adjusting the refractive index of the glass).

Glasses which are suitable for optical waveguides can also be used advantageously for the manufacture of lamp envelopes for halogen and gas discharge lamps because these glasses, like the glasses for optical waveguides, have to be almost water-free and have a high silicon dioxide content.

A method is known for the manufacture of preforms for optical waveguides which starts with highly disperse colloidal $SiO_2$ suspensions which are formed into a green body.

DE No. 30 01 792 describes a method whereby by means of a sol-gel transformation a silicon alcoholate (or silicon alkoxide)/water/alcohol solution is hydrolyzed to a gel in a container of defined shape, the gel is slowly dried and the dry gel is sintered at a temperature below its melting point. With such a method, shaping of the green body is in fact relatively simple, but drying of the gel into a monolithic green body, which has to be performed in such a way that no cracks occur in the green body, presents substantial difficulties. The drying has to be carried out either extraordinarily slowly and is therefore very time consuming or it requires considerable expenditure on equipment (e.g. drying under supercritical conditions in an autoclave). Another difficulty is that in the purification of the dry green body in a heated gas atmosphere, the gas reacts with contaminants present, on account of the very large surfaces (typical size 1000 $m^2/g$) and the associated very small pores between the extremely fine particles. Moreover, when green bodies produced in this way are sintered, pinhole formation is frequently observed as a result of gas molecules adsorbed at the surface and included during the sintering. Another disadvantage is the fact that it is only possible to produce green bodies with low relative green body densities of 10% of the density of compact fused silica. Such green bodies are very sensible to mechanical stresses, are therefore difficult to handle in a manufacturing process and, moreover, they undergo relatively large shrinkage during sintering.

BRIEF SUMMARY OF THE INVENTION

An object of the invention is to create a method and equipment to implement this method, by which it is possible to produce green bodies from a suspension of highly disperse quartz glass particles in such a way that cracking during drying is largely excluded and green bodies are obtained which already have such high density and strength that they are easy to handle and undergo relatively little shrinkage during sintering.

The invention achieves this object by the fact that the starting material (the suspension of the quartz glass particles) is transformed into a state of minimum viscosity and homogenized by the introduction of mechanical forces, is poured, in this minimum viscosity state, into a mold of a hydrophobic material corresponding to the shape of the glass body to be produced the resultant green body formed by thixotropic hardening of the suspension is dried in the mold until a shrinkage of approx. 10% is achieved and then, after removal from the mold, is subjected to the further production steps for the manufacture of the glass body.

DETAILED DESCRIPTION OF THE INVENTION

Figure 1:
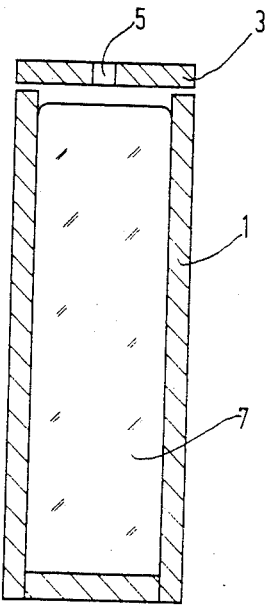
FIG. 1 is a bisectional view of a solid mold employed in carrying out the method of the invention.

The equipment for implementing the method of the invention is characterized by 1. a mold, corresponding to the shape of the glass body to be produced, for receiving the suspension for forming the glass body, this mold being made of a hydrophobic material with a cover which has at least one aperture, through which the dispersing liquid can diffuse out from the suspension during the drying process of the suspension or by 2. a porous mold, corresponding to the shape of the glass body to be produced, made of a hydrophobic, preferably elastic synthetic material with pores with a diameter in the order of the molecules of the dispersing liquid, by means of which the dispersion liquid can diffuse out during the drying process the suspension.

The invention is based on the perception that a particularly high thixotropic effect occurs with suspensions comprising highly disperse $SiO_2$ particles of a diameter in the range from 10 to 500 nm, and that this effect is further enhanced by the addition of an ionogenic substance which promotes the cross-linking of the solid particles in the suspension and shifts the pH-value of the suspension into the acid range (pH<3) or towards the basic range (pH=5.5 to 8), this effect being capable of being used first of all to transform the suspension into a state of minimum viscosity, i.e. liquify it, by the action of mechanical forces, preferably sound or ultrasound, in which state it can be efficiently homogenized and whereby the ionogenic additive promoting a cross-linking reaction of the solid particles is very finely distributed in the suspension. After removal of the mechanical forces the suspension solidifies extremely rapidly as a result of the thixotropic effect and this effect can be utilized to obtain dimensionally stable green bodies from a low-viscosity suspension by means of a mold of hydrophobic material.

The invention is further based on the knowledge that unwanted cracking occurs in green bodies produced from suspensions due to the fact that the surface tension of the dispersing liquid contracts the solid particles during drying. When the binding forces are insufficient, cracks are readily formed, particularly at inhomogeneities. To reduce this risk, it is necessary to achieve as homogeneous a suspension as possible. To reduce the dry shrinkage of a green body and therefore to also reduce the risk of cracking in green bodies produced from suspension, it is also important to start with green bodies with a higher relative density; the density should be at least >35% of the density of compact fused silica. With colloidal suspensions such as are described, for example, in DE No. 30 01 792 it is impossible to achieve such a high density. To prevent cracking during drying in green bodies produced from suspensions it is important, according to a further finding of the invention, that no stresses can occur between the mold, in which a thixotropic suspension solidifies into a dimensionally stable green body, and the green body.

All these findings together have given rise to the method and the equipment suitable for the application of this method.

According to advantageous embodiments of the method according to the invention the dispersing liquid used is water and a suspension is used which contains $SiO_2$ particles with a diameter in the range from 10 to 500 nm, preferably 15 to 100 nm, with a mean particle diameter of 40 nm in the case of a solid/dispersing liquid ratio of 0.5:1 to 1.2:1. This has the advantage that green bodies can be produced with an advantageously high density which amounts to 35 to 50%, preferably 45% of the density of compact fused silica.

According to an additional advantageous embodiment of the method according to the invention, the ionogenic additive is added in a quantity of $\leq 5$ wt.% per solids content in the suspension. This has the advantage that the additive which acts as a cross-linking activator is present in such a quantity that the surface of the solid particle in the suspension are just covered with ions of the ionogenic additive. The quantity of ionogenic material added should not be greater than 5 wt.% per solids content of the suspension because otherwise the viscosity of the suspension is raised to such an extent that efficient homogenization becomes difficult.

According to another advantageous embodiment of the method according to the invention, the ionogenic additive is an ammonium compound and, in particular, $NH_4F$ in aqueous solution which shifts the pH-value of the suspension towards the basic range (pH=5.5 to 8). Ammonium compounds are readily volatile and, therefore, can be removed without trace from the green body in a subsequent purifying/heating stage so that fused silica bodies of a very high purity can be produced. The addition of an ammonium compound, $NH_3$ in aqueous solution for example, results in green bodies of relatively high strength because a gel formation occurs at the points of contact of two $SiO_2$ primary particles. For example, at a suspension temperature of 20° C. and a pH-value of $\leq 10$, of the order of approx. 100 ppm $SiO_2$ passes into solution and is precipitated at the points of contact and thus forms a bridge layer. If $NH_4F$ in aqueous solution is used as the ionogenic additive, fluorine doping can be achieved which, for example, is suitable for the production of cladding glasses for optical waveguides.

Also suitable are ionogenic additives, acting as cross-linking activators, which shift the pH-value of the suspension into the acid region (pH<3); here, too, an optimum thixotropic effect occurs. In this case, HCl can be used for example.

According to a further advantageous embodiment of the method according to the invention, the starting material is transformed into a state of minimum viscosity by the action of sound at a freqency of $f=10$ to 200 Hz, preferably 50 Hz, or ultrasound at a frequency $f=20$ to 50 kHz, preferably 35 kHz. It has been found that by utilizing the thixotropic effect low-viscosity, pourable $SiO_2$ suspensions can be obtained and efficiently homogenized if they are exposed to the action of sound or ultrasound. A gel-sol transformation occurs in thixotropic systems with any form of mechanical action, e.g. stirring or shaking. If, for the purpose of liquefying a higher-viscosity starting material, a sonic or ultrasonic oscillator is used the amplitude of which is dimensioned in such a way that the sonic or ultrasonic field is introduced into the starting material being liquefied, this results in a particularly effective dissolution of packing cavities in the starting material (gas bubbles rise upwards in the low-viscosity starting material and are thus automatically eliminated). Such degassing can be further accelerated, for example, by liquefying the starting material in a vacuum.

According to further advantageous embodiments of the method according to the invention, the molds of hydrophobic material into which the pourable suspension is poured and solidified by means of the thixotropic effect and then dried are molds made of polytetrafluorethylene, polyethylene, polycarbonate, polymethylmethacrylate or polyvinylchloride, preferably with a polished surface, or of porous elastic synthetic material. The suspension introduced into the molds is dried in this case by diffusion of the dispersing agent through at least one aperture at the top of the mould in the case of molds of polished synthetic material or by diffusion of the dispersing agent through pores in the case of molds of porous elastic synthetic material. The use of such molds provides slow drying of the green body, and stresses between the mold and the drying green body are thus avoided.

According to a further advantageous embodiment of the method according to the invention, the material used for the mold is a foil made from a synthetic material which is chemically dissolved in a solvent which has a lower surface tension than the dispersing liquid and is immiscible or largely immiscible with the dispersing liquid. Such a mold may be removed chemically from the dried green body, this has the advantage of preventing any damage to the surface of the green body such as might occur with mechanical removal of the mould.

The particular advantages that can be achieved with the invention are the fact that green bodies of a relatively high density (35 to 50% of the density of compact fused silica) can be produced free of cracks from pourable suspensions with highly disperse $SiO_2$ particles by three-dimensional cross-linking of the solid particles and by means of controlled drying.

Figure 2:
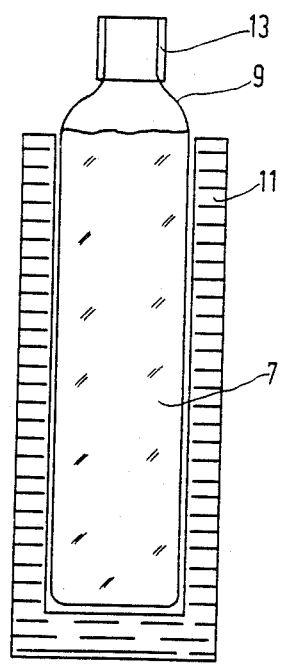
FIG. 2 is a transverse sectional view of a porous mold employed in carrying out the method of the invention.

Embodiments of the invention will be illustrated and explained in greater detail below with the aid of the drawing which shows: FIG. 1 a solid mold according to the invention for the forming and drying of a green body (transverse section). FIG. 2 a porous mould according to the invention for the forming and drying of a green body (transverse section).

An aqueous, pourable suspension was prepared as the starting material for the production of a glass body. For this purpose, 150 g of commercially available $SiO_2$ having a particle diameter of 10 to 100 nm with a mean particle diameter of 40 nm was mixed into 127.3 ml water and 22.7 ml 5% aqueous $NH_4F$ solution and homogenized in a vessel for approx. 10 min under the action of ultrasound with a frequency of f=35 kHz for the purpose of establishing minimum viscosity. The low-viscosity suspension thus produced is then be poured into molds. Because of the thixotropic effect the suspension solidifies into a dimensionally stable green body and is dried in the mold until a shrinkage of approx. 10% is achieved.

In orfer to prevent cracking of the green body due to stresses between it and the mold into which the low-viscosity suspension is poured and in which it solidifies as a result of the spatial cross-linking of the solid particles, a mold is used in which a slow drying process can be performed and in which up to approx. 10% dry shrinkage can be obtained without crack formation. This was achieved by using a mold made of hydrophobic material which is designed in such a way that part of the dispersing liquid can escape from the mould by diffusion. FIG. 1 shows a cylindrical mold 1 of a polished polycarbonate (diameter 26.0 mm) into which the starting material 7 in the form of a low-viscosity suspension was formed. The mold was filled almost completely with the suspension and is sealed off with a cover 3 in such a way that at least one aperture 5 was retained, by means of which the dispersing liquid can diffuse out during the drying process. The starting material 7 contained in mold 1 was dried for a period of 12 days at a temperture of 25° C. After this drying, a shrinkage of the resultant green body of 10.3% was established. In this condition the green body obtained was removed from the mold and dried for another day at a temperature of 60° C. in a drying cupboard. The dried green body had a density of 45% of that of the density of compact fused silica and is free from cracks.

Then the green body was heated in 100 min to a temperature of 800° C. and was exposed for 2 hours to a $SOCl_2$-saturated $O_2$-gas stream for the purpose of removing impurities, particularly water and transition metals. Subsequently sintering to form a fused silica body was carried out at 1500° C. in a helium atmosphere with 2 vol. % chlorine gas addition, during which process the green body was passed through the furnace at a withdrawal speed of 3 mm/min. A transparent, bubble-free and ream-free glass rod with an outside diameter of 20 mm was obtained which had an impurity content of only <10 ppb.

The glass produced in this way has a density of 2.20 $g/cm^3$ and a refractive indes of $n_D=1.4598$.

A green body may also be formed and dried in a thin-walled porous hose of, preferably, an elastic synthetic material, the diameter of the pores of which corresponds to the size of the molecules of the dispersing liquid. Such a mold is shown in FIG. 2.

As shown in FIG. 2a porous hose 9 of silicone rubber with a wall thickness of 0.12 mm and an inside diameter of 20 mm is inserted into a divisible porous support mold in the form of a cylinder 11 with an inside diameter of 26 mm and is inflated such that it sits tight against the support mould. Then, by way of a filler pipe 13 the hose 9 is filled almost completely with starting material in the form of a suspension 7 such as was produced for the example employed in the mold show FIG. 1. After a duration of 2 hours at a temperature of 30° C. the suspension is totally cross-linked, the green body therefore has solidified as a result of the thixotropic effect and can be removed together with the hose from the support mold. The cylindrical-shaped support mold 11 can be suitably made from high-molecular-weight polyethylene with pores with a diameter of 10 μm. After a drying time of 3 days at a temperature of 25° C. the green body has a drying shrinkage of 10.3 %. When the green body shrinks, the hose which expanded during the filling with suspension contracts, therefore despite the enforced very much shorter drying period compared with the example illustrated in FIG. 1, no cracks can occur in the green body as the result of stresses between mould and green body. After the drying shrinkage of 10.3% has been achieved, the green body is extracted from the hose 9. The green body having been removed is then dried for 1 more day at a temperature of 60° C. in a drying cupboard and is then further treated as described with regard to the example in FIG. 1.

In accordance with a further expedient procedure the green body may also be removed by using for the mold a foil made of a synthetic material which is soluble in a solvent that has a lower surface tension that the dispersing liquid and which is immiscible or almost immiscible with the dispersing liquid. If, for example, a foil hose made of polycarbonate is used, this can be dissolved in methylene chloride. Chemical removal of the mold reliably prevents surface damage of the green body.

Rod-shaped fused silica bodies have been produced in the moulds described in relation to FIGS. 1 and 2. In a similar manner, tubular fused silica bodies can also be produced if, for example, an inflated resilient plastic hose which may be permeable to water vapour or watertight, is centrically arranged in the porous hose 9 as in FIG. 2 or in the solid mould as in FIG. 1.

What is claimed is:

1. A method for the manufacture of a glass body, said method comprising:
    (a) forming a starting thixotropic suspension of silicon dioxide in a dispersing liquid;
    (b) applying a mechanical force in sufficient degree to said suspension to homogenize said suspension and reduce its viscosity to the minimum;
    (c) pouring the resultant low-viscosity suspension into a mold made of a hydrophobic material and having a shape corresponding to the shape of the glass body to be produced and allowing said suspension to thixotropically solidify in said mold to form a green body;
    (d) drying the green body while in said mold until a shrinkage of about 10% of the green body is achieved;
    (e) then removing the green body from said mold and subjecting the green body to additional manufacturing steps for the production of the glass body.

2. The method as claimed in claim 1, wherein starting suspension for the glass body is a suspension which contains $SiO_2$ particles having diameters in the range from 10 to 500 nm, preferably 15 to 100 nm, with a mean particle diameter of 40 nm.

3. The method as claimed in claim 2, wherein a suspension with a solid-dispersing liquid ratio of 0.5:1 to 1.2:1 is used.

4. The method as claimed in claim 1, wherein the dispersing liquid is water.

5. The method as claimed in claim 1, wherein an ionogenic additive which shifts the pH-value of the suspension towards the basic region (pH=5.5–8) is added to the suspension.

6. The method as claimed in claim 5, wherein the ionogenic additive is added in a quantity of $\leq 5$ wt.% per solids content in the suspension.

7. The method as claimed in claim 5, wherein an ammonium compound is used as the additive.

8. The method as claimed in claim 7, wherein an aqueous 5% $NH_4F$ solution is used as the additive.

9. The method as claimed in claim 8, wherein the starting suspension used is an aqueous suspension which contains $SiO_2$ particles having diameters in the range from 10 to 100 nm with a mean particle diameter of 40 nm and a $SiO_2$:water weight ratio of 1:1, to which a 5% $NH_4F$ aqueous solution is added as the ionogenic additive in a quantity of 0.8 wt.% per solids content in the suspension.

10. A method as claimed in claim 1, wherein the viscosity of the starting suspension is reduced to the minimum by the action of sound at a frequency $f=20$ to 200 Hz or ultrasound at a frequency $f=20$ to 50 kHz.

11. A method as claimed in claim 1, wherein the starting suspension is poured into a mold of synthetic material and is dried by means of diffusion of the dispersing agent through at least one aperture at the top of the mold.

12. The method as claimed in claim 11, wherein the material used for the mould is polytetrafluoroethylene, polyethylene, polycarbonate, polymethylmethacrylate or polyvinylchloride, preferably with a polished surface.

13. A method as claimed in claim 1, wherein the starting suspension is poured into a mold made of a porous elastic synthetic material with pores the size of the molecules of the dispersing liquid and is dried by diffusion of the dispersing agent through the pores.

14. The method as claimed in claim 13, wherein the mold is a thin-walled hose of silicone rubber which is arranged in a porous support mould corresponding to the shape of the glass body to be produced.

15. The method as claimed in claim 11, wherein the mold is made of a plastic foil which is soluble in a solvent which has a lower surface tension than the dispersing liquid and is immiscible or largely immiscible with the dispersing liquid.

* * * * *